United States Patent
Jung

(10) Patent No.: US 11,434,603 B2
(45) Date of Patent: Sep. 6, 2022

(54) NATURAL DYEING METHOD USING SHOULIANG YAM RHIZOME

(71) Applicant: ISAE FnC, Ltd., Seoul (KR)

(72) Inventor: Kyoung A Jung, Seoul (KR)

(73) Assignee: ISAE FNC, LTD., Seoul (KR)

( * ) Notice: Subject to any disclaimer, the term of this patent is extended or adjusted under 35 U.S.C. 154(b) by 0 days.

(21) Appl. No.: 17/132,872

(22) Filed: Dec. 23, 2020

(65) Prior Publication Data

US 2022/0178073 A1     Jun. 9, 2022

(30) Foreign Application Priority Data

Dec. 4, 2020    (KR) ......................... 10-2020-0167938

(51) Int. Cl.
| | |
|---|---|
| *D06P 1/34* | (2006.01) |
| *C09B 61/00* | (2006.01) |
| *D06M 15/356* | (2006.01) |
| *D06P 1/00* | (2006.01) |

(52) U.S. Cl.
CPC ................ *D06P 1/34* (2013.01); *C09B 61/00* (2013.01); *D06M 15/3568* (2013.01); *D06P 1/002* (2013.01)

(58) Field of Classification Search
CPC ............ D06P 1/34; D06P 1/002; C09B 61/00; D06M 15/3568
See application file for complete search history.

(56) References Cited

FOREIGN PATENT DOCUMENTS

| | | | | |
|---|---|---|---|---|
| CN | 102061631 A | | 5/2011 | |
| CN | 106192271 | * | 12/2016 | ............. D06B 23/18 |
| CN | 106978744 | * | 7/2017 | ............ D06M 13/46 |
| CN | 106978744 A | | 7/2017 | |
| KR | 10-2010-0104585 A | | 9/2010 | |
| KR | 10-1004658 B1 | | 1/2011 | |
| KR | 10-2018737 B1 | | 11/2019 | |
| KR | 10-2018738 B1 | | 11/2019 | |

OTHER PUBLICATIONS https://www-sc-victory-com.translate.goog/yaocai/2728.html?_x_tr_sl=zh-CN&_x_tr_hl=en&_x_tr_pto=sc Shoulang Yam Rhizome Jun. 13, 2022.*
Extended European Search Report of European Patent Application No. 20216947.0—6 pages (dated Jul. 2, 2021).
Office Action in Korean Application No. 10-2020-0167938 dated Mar. 23, 2022 in 5 pages.

* cited by examiner

*Primary Examiner* — Amina S Khan
(74) *Attorney, Agent, or Firm* — Knobbe Martens Olson & Bear LLP

(57) ABSTRACT

The present disclosure relates to a natural dyeing method using shouliang yam rhizome, and more particularly to a natural dyeing method using shouliang yam rhizome, which prevents the discoloration of a naturally dyed fabric, is harmless to the human body, and exhibits excellent color development, excellent antibacterial activity, excellent deodorization, and excellent dyeing fastness such as friction fastness and light fastness.

10 Claims, No Drawings

NATURAL DYEING METHOD USING SHOULIANG YAM RHIZOME

CROSS-REFERENCE TO RELATED APPLICATION

This application claims priority to and the benefit of Korean Patent Application No. 10-2020-0167938, filed on Dec. 4, 2020, the disclosure of which is incorporated herein by reference in its entirety.

BACKGROUND

1. Field

The present disclosure relates to a natural dyeing method using shouliang yam rhizome.

2. Discussion of Related Art

Generally, natural dyeing refers to the process of coloring fabrics using vegetable, animal, or mineral dyes. Such natural dyeing is characterized by not having higher color saturation than chemical dyes, and being highly eco-friendly and highly human-friendly.

Compared with synthetic dyeing, such natural dyeing is advantageous in terms of natural color, excellent aesthetic performance, and having functionalities such as antibacterial, deodorizing, and anti-allergic properties due to natural dyeing using processed natural materials as dyes. In addition, natural dyes are advantageous in that wastewater and odor, which accompany the use of synthetic dyes, do not occur, and they are eco-friendly.

Korean Patent Publication No. 10-2010-0104585 (publication date: Sep. 29, 2010) and Korean Patent Registration No. 10-1004658 (publication date: Dec. 22, 2010) disclose related technologies.

The disclosure of this section is to provide background information relating to the present disclosure. Applicant does not admit that any information contained in this section constitutes prior art.

SUMMARY

The present disclosure provides a natural dyeing method using shouliang yam rhizome that not only undergoes no color change, but also exhibits excellent antibacterial activity and deodorization, and not only exhibits excellent management and practicality without a change in the shape of a material, but also exhibits excellent natural red dyeing performance and excellent dyeing fastness such as friction fastness and light fastness.

The present disclosure further provides a natural dyeing method using shouliang yam rhizome, which prevents the discoloration of a naturally dyed fabric, is harmless to the human body, and exhibits excellent color development, excellent antibacterial activity, excellent deodorization, and excellent dyeing fastness such as friction fastness and light fastness.

According to an aspect of the present disclosure, a natural dyeing method using shouliang yam rhizome may include: a first process of preparing a shouliang yam rhizome extract by mixing crushed shouliang yam rhizome and water, and then extracting the mixture at a temperature between about 28° C. and about 36° C. for about 1 hour to about 5 hours; a second process of performing dyeing twice or more by immersing a fabric in the shouliang yam rhizome extract and drying the immersed fabric; a third process of performing first color development twice or more by immersing the fabric subjected to the dyeing process in a mixed solution of the shouliang yam rhizome extract and water and drying the immersed fabric; a fourth process of performing aging twice or more by uniformly spreading mud on one surface of the fabric subjected to the first color development, followed by aging for about 60 minutes to about 90 minutes, and drying the aged fabric; a fifth process of performing second color development twice or more by immersing the fabric subjected to the aging process in the shouliang yam rhizome extract and drying the fabric; and a sixth process of coating both surfaces of the fabric subjected to the second color development process with a silicon coating solution to produce a naturally dyed fabric.

In an embodiment of the present disclosure, the mixing of the first process may include mixing crushed shouliang yam rhizome and water in a weight ratio of about 1:about 0.8-1.6.

In an embodiment of the present disclosure, the dyeing of the second process may be performed 20 times to 40 times.

In an embodiment of the present disclosure, the mixed solution of the third process may have a temperature of about 24° C. to about 32° C., and may be obtained by mixing the shouliang yam rhizome extract and water in a weight ratio of about 1:about 0.8-1.6.

In an embodiment of the present disclosure, the first color development of the third process may be performed three to nine times.

In an embodiment of the present disclosure, the second color development of the fifth process may be performed three to nine times.

In an embodiment of the present disclosure, the mud in the fourth process may be uniformly spread on one surface of the fabric subjected to the first color development process to have an average thickness of about 3 mm to about 5 mm.

In an embodiment of the present disclosure, the aging of the fourth process may be performed 20 times to 30 times.

In an embodiment of the present disclosure, the silicon coating solution may include a first silicon base solution and a second silicon base solution in a weight ratio of about 1:about 8-12.

In an embodiment of the present disclosure, the first silicon base solution may include about 65 wt % to about 75 wt % of a compound represented by Formula 1 below and about 25 wt % to about 35 wt % of a compound represented by Formula 2 below, with respect to the total weight %.

In an embodiment of the present disclosure, the second silicon base solution may include about 75 wt % to about 85 wt % of a compound represented by Formula 1 below, about 5 wt % to about 15 wt % of silicon dioxide, and about 5 wt % to about 15 wt % of a compound represented by Formula 3 below, with respect to the total weight %.

[Formula 1]

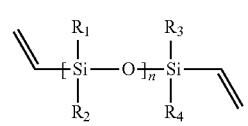

wherein, in Formula 1, $R_1$, $R_2$, $R_3$, and $R_4$ are each independently a C1-C5 alkyl group, and n is a rational number satisfying 1 to 500,

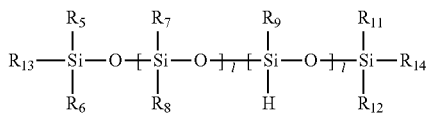
[Formula 2]

wherein, in Formula 2, $R_5$, $R_6$, $R_7$, $R_8$, $R_9$, $R_{11}$, $R_{12}$, $R_{13}$, and $R_{14}$ are each independently a C1-C5 alkyl group, and l and m are each independently a rational number satisfying 1 to 300, and

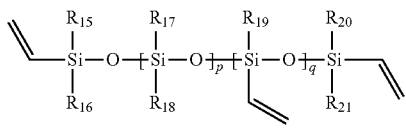
[Formula 3]

wherein, in Formula 3, $R_{15}$, $R_{16}$, $R_{17}$, $R_{18}$, $R_{19}$, $R_{20}$, and $R_{21}$ are each independently a C1-C5 alkyl group, and q and p are each a rational number satisfying 1 to 300.

In an embodiment of the present disclosure, the fabric may be cotton, linen, silk, or wool.

In an embodiment of the present disclosure, the following condition (1) may be satisfied.

$$1.0 \leq B/A \leq 1.25 \quad (1)$$

In condition (1), A denotes a basis weight (g/m²) of the fabric, and B denotes a basis weight (g/m²) of the naturally dyed fabric.

DETAILED DESCRIPTION OF EMBODIMENTS

Hereinafter, embodiments of the present disclosure will be described in detail in such a way that the present disclosure may be easily carried out by those of ordinary skill in the art to which the disclosure pertains. The present disclosure may be embodied in various different forms and is not limited to embodiments set forth herein.

Generally, the use of natural dyes gradually decreases as synthetic dyes are developed, due to limited production of dyes, unsatisfactory fastness of dyed products, and ease of forming dyeing stains, and thus currently, natural dyes are not used much except for special purposes. In natural dyes, the content of a pigment component varies depending on various environmental changes, such as production area, growing environment, nutritional status, and collection time, and the color of a dyed product varies depending on a pigment extraction method, a dyeing method, and the like, and thus natural dyes are not very suitable for mass production required by modern industry, which is one of reasons for poor industrialization thereof. In particular, low fastness of dyed products during natural dyeing is considered as one of obstacles to the modernization of natural dye dyeing techniques.

Meanwhile, "Seorang" is a perennial climbing plant belonging to the genus *Dioscorea*, the family Dioscoreaceae and the stem length reaches about 10 m. The plant is distributed in southern Zhejiang province, southern Jiangxi province, Taiwan, Hunan province, Guangdong province, and the like, and other than China, is distributed in India, the Philippines, the Yaeyama Islands of Okinawa, Japan, Vietnam, Laos, and the like. There are two types of "Seorang", exhibiting reddish purple and yellow depending on the color of a cutting surface, and the reddish purple type contains more pigments. "Seorang" uses the Chinese characters "shu," which means yam, and "liang," which means *Pennisetum alopecuroides*, and called shuliang in China, which is a major producer, and called shouliang yam rhizome in English.

The tubers of shouliang yam rhizome contain about 6-13% of tannin. Tannin protects fur and leather, and is used for dyeing ramie, silk, cotton, and the like. Shouliang yam rhizome, which is used as a dye, is a tuber extract containing tannic acid and colloidal substances, and this extract can be used as a raw material for alcohol. When shouliang yam rhizome is used as a dye, not only fresh fruits but also semi-dried fruits of shouliang yam rhizome are stored in a refrigerator for use. It is also possible to use completely dried fruits. Meanwhile, shouliang yam rhizome has a large amount of tannin, and thus is similar to but differs from persimmon juice dyeing. In persimmon juice dyeing, the color appears only when persimmon juice is absorbed onto a fabric and then exposed to sunlight for color development, and thus a portion of the fabric that is not exposed to sunlight has a weak color. However, a fabric dyed with a shouliang yam rhizome extract has the advantage of showing color immediately.

In the present disclosure, a method of naturally dyeing a fabric using shouliang yam rhizome, whereby not only excellent color development but also excellent antibacterial activity are exhibited, and decolorization of natural dyeing due to daylight, washing, water, sweat, and the like can be prevented, was developed, thus completing the present disclosure.

A natural dyeing method using shouliang yam rhizome according to the present disclosure includes first to sixth processes.

First, the first process of the natural dyeing method using shouliang yam rhizome according to the present disclosure may be to mix crushed shouliang yam rhizome and water, and then extract the mixture to prepare a shouliang yam rhizome extract. The shouliang yam rhizome extract of the present disclosure is used as a dye for dyeing a fabric.

The crushed shouliang yam rhizome may be obtained by washing shouliang yam rhizome collected from nature and crushing the same.

In addition, the mixing of the first process may include mixing crushed shouliang yam rhizome and water in a weight ratio of about 1:about 0.8-1.6, in one embodiment, in a weight ratio of about 1:about 1.0-1.4, and in another embodiment, in a weight ratio of about 1:about 1.1-1.3. When the weight ratio is less than 1:0.8, stains may occur due to non-uniform coloration of the precipitate. When the weight ratio exceeds 1:1.6, the color of the shouliang yam rhizome dye becomes weak, and thus there may be a problem with color sharpness and color development.

In addition, the extraction of the first process may be performed at a temperature between about 28° C. and about 36° C., in one embodiment, between about 30° C. and about 34° C. for about 1 hour to about 5 hours, in one embodiment, about 2 hours to about 4 hours. When the extraction temperature is less than 28° C., there may be problems of the coloration of a dye using shouliang yam rhizome and bleeding in the subsequent washing. When the extraction temperature exceeds 36° C., there may be problems of stains and color changes due to contamination of shouliang yam rhizome and water itself.

Next, the second process of the natural dyeing method using shouliang yam rhizome according to the present disclosure may be to perform dyeing by immersing a fabric in a shouliang yam rhizome extract and drying the immersed fabric.

The fabric prepared in the second process may be cotton, linen, silk, or wool, in one embodiment, silk.

In addition, the basis weight of the fabric prepared in the second process is not particularly limited, but may range from, in one embodiment, about 45 g/m$^2$ to about 60 g/m$^2$, in another embodiment, about 50 g/m$^2$ to about 54 g/m$^2$.

In addition, the shouliang yam rhizome extract used in the second process may be the shouliang yam rhizome extract prepared in the first process, and the immersion may be performed for about 30 minutes to about 90 minutes, in one embodiment, 45 minutes to about 75 minutes.

In addition, the drying of the second process may be performed until the fabric is completely dried in a natural state after the immersed fabric is taken out, and may be performed for approximately 1-5 hours.

Meanwhile, the dyeing of the second process may be performed twice or more, in one embodiment, 20 times to 40 times, and in another embodiment, 25 times to 35 times. When the dyeing of the second process is performed less than 20 times, the intrinsic color characteristic of shouliang yam rhizome itself is unable to be expressed, and thus sharpness may deteriorate and there may be a problem of bleeding in the subsequent processing process. When the dyeing of the second process is performed greater than 40 times, there may be problems with the durability of the fabric and of damage to texture, dark stains, and excessive dull color.

Next, the third process of the natural dyeing method using shouliang yam rhizome according to the present disclosure may be to perform first color development by immersing the fabric subjected to the dyeing of the second process in a mixed solution of the shouliang yam rhizome extract and water and drying the immersed fabric.

In this case, the mixed solution in the third process may have a temperature between about 24° C. and about 32° C., in one embodiment, a temperature between about 26° C. and about 30° C. When the temperature of the mixed solution is less than 24° C., there may be a problem with fixing or adhesion of the shouliang yam rhizome dye to the fabric. When the temperature of the mixed solution exceeds 32° C., there may be problems with contamination of the shouliang yam rhizome dye and textural stability of the fabric.

In addition, the mixed solution of the third process may be a solution obtained by mixing the shouliang yam rhizome extract and water in a weight ratio of about 1:about 0.8-1.6, in one embodiment, in a weight ratio of about 1:about 1.0-1.4, and in another embodiment, in a weight ratio of about 1:about 1.1-1.3. When the weight ratio is less than 1:0.8, the shouliang yam rhizome extract is not uniformly mixed, and thus, when the shouliang yam rhizome dye is fixed to the fabric, marks due to the concentration difference may occur. When the weight ratio exceeds 1:1.6, the color may become weak due to mixing of excessive water.

In addition, the immersion of the third process may be performed for about 1 minute to about 30 minutes, in one embodiment, about 5 minutes to about 15 minutes.

In addition, the drying of the third process may be performed until the fabric is completely dried in a natural state after the immersed fabric is taken out, and may be performed for approximately 1-5 hours.

Meanwhile, the first color development of the third process may be performed twice or more, in one embodiment, three to nine times, and in another embodiment, five to seven times. When the first color development of the third process is performed less than three times, there may be problems with dyeing sharpness, light fastness, and color fastness. When the first color development of the third process is performed greater than nine times, there may be problems of fabric deformation, color blurring, and bleeding.

Next, the fourth process of the natural dyeing method using shouliang yam rhizome according to the present disclosure may be to perform aging by uniformly spreading mud on one surface of the fabric subjected to the first color development of the third process, followed by aging, and drying the aged fabric.

In this case, the aging of the fourth process may be performed for about 60 minutes to about 90 minutes, in one embodiment, for about 70 minutes to about 80 minutes. When the aging time is less than 60 minutes, the mud is not sufficiently absorbed into the fabric, thus being unable to form a physical environment for the subsequent process, resulting in deteriorated color development. When the aging time exceeds 90 minutes, there may be a problem of damage to the fabric.

In addition, the aging of the fourth process may be performed at a temperature between about 15° C. and about 45° C., in one embodiment, a temperature between about 25° C. and about 35° C., and may be performed in airy shade.

In addition, the mud in the fourth process is uniformly spread only on one surface of the fabric. If the mud is spread on both surfaces of the fabric rather than one surface, appearance quality may be deteriorated due to discoloration to an uneven color.

In addition, the mud in the fourth process may be uniformly spread on one surface of the fabric so as to have an average thickness of about 3 mm to about 5 mm, in one embodiment, about 3.5 mm to about 4.5 mm. When the average thickness is less than 3 mm, appearance quality may be deteriorated due to non-uniform dyeing. When the average thickness exceeds 5 mm, the fabric may be damaged due to poor breathability of the fabric, or staining of the fabric occurs due to the deterioration of dyeing adhesion.

In addition, the drying of the fourth process may be performed until the fabric is completely dried in a natural state after the mud is removed from the surface of the fabric by washing the aged fabric, and may be performed for approximately 1-5 hours.

Meanwhile, the aging of the fourth process may be performed twice or more, in one embodiment, 20 times to 30 times, and in another embodiment, 21 times to 25 times. When the aging of the fourth process is performed less than 20 times, appearance quality may be deteriorated because the surface of the fabric is peeled off or marks caused by drying of the mud remain on the fabric. When the aging of the fourth process is performed greater than 30 times, there may be a problem in aging the fabric due to an excessive aging process.

Next, the fifth process of the natural dyeing method using shouliang yam rhizome according to the present disclosure may be to perform second color development by immersing the fabric subjected to the aging of the fourth process in a shouliang yam rhizome extract and drying the immersed fabric.

In this case, the shouliang yam rhizome extract used in the fifth process may be the shouliang yam rhizome extract prepared in the first process, and the immersion may be performed for about 3 hours to about 9 hours, in one embodiment, for about 5 hours to about 7 hours.

In addition, the drying of the fifth process may be performed until the fabric is completely dried in a natural state after the immersed fabric is taken out, and may be performed for approximately 1 to 5 hours.

Meanwhile, the second color development of the fifth process may be performed twice or more, in one embodiment, three to nine times, and in another embodiment, five to seven times. When the second color development of the fifth process is performed less than three times, there may be a problem of stripes or uneven marks on the surface of the fabric. When the second color development of the fifth process is performed greater than nine times, there may be problems of damage due to aging of the fabric and color blurring.

Lastly, the sixth process of the natural dyeing method using shouliang yam rhizome according to the present disclosure may be to coat both surfaces of the fabric subjected to the second color development in the fifth process with a silicon coating solution to produce a naturally dyed fabric.

In this case, the basis weight of the naturally dyed fabric produced in the sixth process is not particularly limited, but may range from, in one embodiment, about 47 g/m² to about 62 g/m², in another embodiment, about 52 g/m² to about 56 g/m².

In addition, in embodiments, the following condition (1) may be satisfied.

(1) 1.0≤B/A≤1.25, in one embodiment, 1.0≤B/A≤1.15, in another embodiment, 1.02≤B/A≤1.09

In condition (1), A denotes the basis weight (g/m²) of the fabric, and B denotes the basis weight (g/m²) of the naturally dyed fabric.

The silicon coating solution used in the sixth process may include a first silicon base solution and a second silicon base solution in a weight ratio of about 1:about 8-12, in one embodiment, about 1:about 9-11.

The first silicon base solution may include a compound represented by Formula 1 below in an amount of about 65 wt % to about 75 wt %, in one embodiment, about 68 wt % to about 72 wt %, with respect to the total weight %.

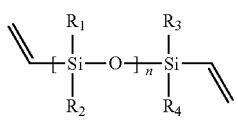
[Formula 1]

wherein, in Formula 1, $R_1$, $R_2$, $R_3$, and $R_4$ are each independently a C1-C5 alkyl group, in one embodiment, each independently a C1-C3 alkyl group, and n is a rational number satisfying 1 to 500, in one embodiment, a rational number satisfying 1 to 300.

More particularly, the compound represented by Formula 1 above may be a material with chemical abstracts service registry number (CAS No.) 68083-19-2.

In addition, the first silicon base solution may include a compound represented by Formula 2 below in an amount of about 25 wt % to about 35 wt %, in one embodiment, about 28 wt % to about 32 wt %, with respect to the total weight %.

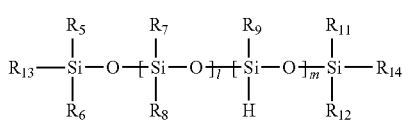
[Formula 2]

wherein, in Formula 2, $R_5$, $R_6$, $R_7$, $R_8$, $R_9$, $R_{11}$, $R_{12}$, $R_{13}$, and $R_{14}$ are each independently a C1-C5 alkyl group, in one embodiment, each independently a C1-C3 alkyl group, and l and m are each independently a rational number satisfying 1 to 300, in one embodiment, each independently a rational number satisfying 1 to 150.

More particularly, the compound represented by Formula 2 may be a material with chemical abstracts service registry number (CAS No.) 68037-59-2.

In addition, the second silicon base solution may include the compound represented by Formula 1 in an amount of about 75 wt % to about 85 wt %, in one embodiment, about 78 wt % to about 82 wt %, with respect to the total weight %.

In addition, the second silicon base solution may include silicon dioxide in an amount of about 5 wt % to about 15 wt %, in one embodiment, about 8 wt % to about 12 wt %, with respect to the total weight %.

In addition, the second silicon base solution may include a compound represented by Formula 3 below in an amount of about 5 wt % to about 15 wt %, in one embodiment, about 8 wt % to about 12 wt %, with respect to the total weight %.

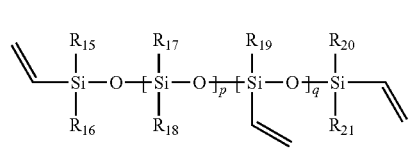
[Formula 3]

wherein, in Formula 3, $R_{15}$, $R_{16}$, $R_{17}$, $R_{18}$, $R_{19}$, $R_{20}$, and $R_{21}$ are each independently a C1-C5 alkyl group, in one embodiment, a C1-C3 alkyl group, and q and p are each independently a rational number satisfying 1 to 300, in one embodiment, each independently a rational number satisfying 1 to 150.

More particularly, the compound represented by Formula 3 may be a material with chemical abstracts service registry number (CAS No.) 68083-18-1.

In addition, the sixth process may be to coat both surfaces of the fabric subjected to the second color development of the fifth process with a silicon coating solution and cure the coated fabric at a temperature ranging from about 100° C. to about 150° C., in one embodiment, about 110° C. to about 140° C., for about 1 minute to about 5 minutes, in one embodiment, for about 2 minutes to about 4 minutes, thereby producing a naturally dyed fabric.

While the embodiments of the present disclosure have been described, these embodiments are provided for illustrative purposes only and are not intended to limit the scope of the present disclosure, and it will become apparent to those of ordinary skill in the art to which embodiments of the present disclosure pertain that various modifications and applications, which are not set forth herein, can be made without departing from the essential characteristics of the present disclosure. For example, each of the elements specifically shown in the embodiments of the present disclosure can be modified. Also, differences related to these modifications and applications should be construed as being within the scope of the present disclosure defined by the appended claims.

Preparation Example 1: Preparation of Shouliang Yam Rhizome Extract

Shouliang yam rhizome collected between May and June in southern Guangdong province, China was washed and crushed to prepare crushed shouliang yam rhizome. The prepared crushed shouliang yam rhizome and water were mixed in a weight ratio of 1:1.2, followed by extraction at a temperature of 32° C. for 3 hours, to thereby prepare a shouliang yam rhizome extract.

Preparation Example 2: Preparation of Silicon Coating Solution (1) A first silicon base solution including, with respect to the total weight %, 70 wt % of a compound represented by Formula 1-1 and 30 wt % of a compound represented by Formula 2-1 below was prepared.

(2) A second silicon base solution including, with respect to the total weight %, 80 wt % of a compound represented by Formula 1-1 below, 10 wt % of silicon dioxide, and 10 wt % of a compound represented by Formula 3-1 below was prepared.

(3) The first silicon base solution and the second silicon base solution were mixed in a weight ratio of 1:10 to thereby prepare a silicon coating solution.

[Formula 1-1]

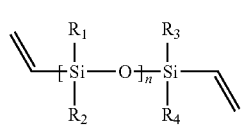

wherein, in Formula 1-1, $R_1$, $R_2$, $R_3$, and $R_4$ are methyl groups, and n is 1.

[Formula 2-1]

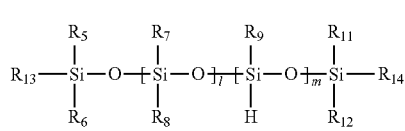

wherein, in Formula 2-1, $R_5$, $R_6$, $R_7$, $R_8$, $R_9$, $R_{11}$, $R_{12}$, $R_{13}$, and $R_{14}$ are methyl groups, and l and m are 1.

[Formula 3-1]

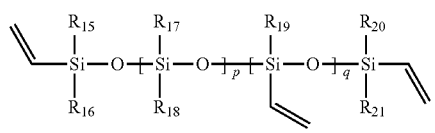

wherein, in Formula 3-1, $R_{15}$, $R_{16}$, $R_{17}$, $R_{18}$, $R_{19}$, $R_{20}$, and $R_{21}$ are methyl groups, and q and p are 1.

Example 1: Production of Naturally Dyed Fabric Using Shouliang Yam Rhizome (1) Silk having a basis weight of 52 g/m² was prepared as a fabric.

(2) A dyeing process was performed by immersing the prepared fabric in the shouliang yam rhizome extract prepared according to Preparation Example 1 for 1 hour, taking out the immersed fabric, and completely drying the fabric in a natural state, and the dyeing process was performed 30 times.

(3) A first color development process was performed by immersing the fabric subjected to the dyeing process in a mixed solution having a temperature of 28° C. for 10 minutes, taking out the immersed fabric, and then completely drying the fabric in a natural state, and the first color development process was performed six times. In this case, the used mixed solution was a solution obtained by mixing the shouliang yam rhizome extract prepared according to Preparation Example 1 and water in a weight ratio of 1:1.2.

(4) An aging process was performed by uniformly spreading mud on one surface of the fabric subjected to the first color development process so as to have an average thickness of 4 mm, aging the fabric in airy shade at a temperature of 30° C. for 75 minutes, washing the fabric to remove the mud, and then completely drying the fabric in a natural state, and the aging process was performed 23 times. In this case, the used mud was collected in Shunde, Guangdong Province.

(5) A second color development process was performed by immersing the fabric subjected to the aging process in the shouliang yam rhizome extract prepared according to Preparation Example 1 for 6 hours, taking out the immersed fabric, and then completely drying the fabric in a natural state, and the second color development process was performed six times.

(6) Both surfaces of the fabric subjected to the second color development process were coated with the silicon coating solution prepared according to Preparation Example 2, followed by curing at a temperature of 120° C. for 2.5 minutes, thereby producing a naturally dyed fabric having a basis weight of 54 g/m².

Example 2: Production of Naturally Dyed Fabric Using Shouliang Yam Rhizome

A naturally dyed fabric was produced in the same manner as in Example 1, except that the dyeing process was performed ten times instead of 30 times.

Example 3: Production of Naturally Dyed Fabric Using Shouliang Yam Rhizome

A naturally dyed fabric was produced in the same manner as in Example 1, except that the dyeing process was performed 50 times instead of 30 times.

Example 4: Production of Naturally Dyed Fabric Using Shouliang Yam Rhizome

A naturally dyed fabric was produced in the same manner as in Example 1, except that the first color development process was performed 15 times instead of six times.

Example 5: Production of Naturally Dyed Fabric Using Shouliang Yam Rhizome

A naturally dyed fabric was produced in the same manner as in Example 1, except that the second color development process was performed 15 times instead of six times.

Example 6: Production of Naturally Dyed Fabric Using Shouliang Yam Rhizome

A naturally dyed fabric was produced in the same manner as in Example 1, except that the aging process was performed ten times instead of 23 times.

Example 7: Production of Naturally Dyed Fabric Using Shouliang Yam Rhizome

A naturally dyed fabric was produced in the same manner as in Example 1, except that the aging process was performed 50 times instead of 23 times.

Example 8: Production of Naturally Dyed Fabric Using Shouliang Yam Rhizome

A naturally dyed fabric was produced in the same manner as in Example 1, except that the aging process was performed by uniformly spreading mud on one surface of the fabric subjected to the first color development process so as to have an average thickness of 1 mm, aging the fabric in airy shade at a temperature of 30° C. for 75 minutes, washing the fabric to remove the mud, and then completely drying the fabric in a natural state.

Example 9: Production of Naturally Dyed Fabric Using Shouliang Yam Rhizome

A naturally dyed fabric was produced in the same manner as in Example 1, except that the aging process was performed by uniformly spreading mud on one surface of the fabric subjected to the first color development process so as to have an average thickness of 10 mm, aging the fabric in airy shade at a temperature of 30° C. for 75 minutes, washing the fabric to remove the mud, and then completely drying the fabric in a natural state.

Comparative Example 1: Production of Naturally Dyed Fabric Using Shouliang Yam Rhizome (1) Silk having a basis weight of 52 g/m² was prepared as a fabric.

(2) A dyeing process was performed once by immersing the prepared fabric in the shouliang yam rhizome extract prepared according to Preparation Example 1 for 1 hour, taking out the immersed fabric, and completely drying the fabric in a natural state.

(3) A first color development process was performed once by immersing the fabric subjected to the dyeing process in a mixed solution having a temperature of 28° C. for 10 minutes, taking out the immersed fabric, and then completely drying the fabric in a natural state. In this case, the used mixed solution was a solution obtained by mixing the shouliang yam rhizome extract prepared according to Preparation Example 1 and water in a weight ratio of 1:1.2.

(4) An aging process was performed once by uniformly spreading mud on one surface of the fabric subjected to the first color development process so as to have an average thickness of 4 mm, aging the fabric in airy shade at a temperature of 30° C. for 75 minutes, washing the fabric to remove the mud, and then completely drying the fabric in a natural state. In this case, the used mud was collected in Shunde, Guangdong Province.

(5) A second color development process was performed once by immersing the fabric subjected to the aging process in the shouliang yam rhizome extract prepared according to Preparation Example 1 for 6 hours, taking out the immersed fabric, and then completely drying the fabric in a natural state.

(6) Both surfaces of the fabric subjected to the second color development process were coated with the silicon coating solution prepared according to Preparation Example 2, followed by curing at a temperature of 120° C. for 2.5 minutes, thereby producing a naturally dyed fabric.

Comparative Example 2: Production of Naturally Dyed Fabric Using Shouliang Yam Rhizome (1) Silk having a basis weight of 52 g/m² was prepared as a fabric.

(2) A dyeing process was performed by immersing the prepared fabric in the shouliang yam rhizome extract prepared according to Preparation Example 1 for 1 hour, taking out the immersed fabric, and completely drying the fabric in a natural state, and the dyeing process was performed 30 times.

(3) A first color development process was performed by immersing the fabric subjected to the dyeing process in a mixed solution having a temperature of 28° C. for 10 minutes, taking out the immersed fabric, and then completely drying the fabric in a natural state, and the first color development process was performed six times. In this case, the used mixed solution was a solution obtained by mixing the shouliang yam rhizome extract prepared according to Preparation Example 1 and water in a weight ratio of 1:1.2.

(4) Both surfaces of the fabric subjected to the first color development process were coated with the silicon coating solution prepared according to Preparation Example 2, followed by curing at a temperature of 120° C. for 2.5 minutes, thereby producing a naturally dyed fabric.

Comparative Example 3: Production of Naturally Dyed Fabric Using Shouliang Yam Rhizome A naturally dyed fabric was produced in the same manner as in Example 1, except that the aging process was performed by uniformly spreading mud on one surface of the fabric subjected to the first color development process so as to have an average thickness of 4 mm, aging the fabric in airy shade at a temperature of 30° C. for 30 minutes, washing the fabric to remove the mud, and then completely drying the fabric in a natural state.

Comparative Example 4: Production of Naturally Dyed Fabric Using Shouliang Yam Rhizome A naturally dyed fabric was produced in the same manner as in Example 1, except that the aging process was performed by uniformly spreading mud on one surface of the fabric subjected to the first color development process so as to have an average thickness of 4 mm, aging the fabric in airy shade at a temperature of 30° C. for 120 minutes, washing the fabric to remove the mud, and then completely drying the fabric in a natural state.

Comparative Example 5: Production of Naturally Dyed Fabric Using Shouliang Yam Rhizome A naturally dyed fabric was produced in the same manner as in Example 1, except that the aging process was performed by uniformly spreading mud on both surfaces of the fabric subjected to the first color development process so as to have an average thickness of 4 mm, aging the fabric in airy shade at a temperature of 30° C. for 120 minutes, washing the fabric to remove the mud, and then completely drying the fabric in a natural state.

Experimental Example 1

The following physical properties of each of the naturally dyed fabrics produced according to Examples 1 to 9 and Comparative Examples 1 to 5 were measured, and the results thereof are shown in Tables 1 to 3 below.

1. Fastness
   (1) Friction fastness was measured in accordance with the ISO 105-X12 test standard.
   (2) Light/perspiration fastness was measured in accordance with the KS K 0701:2014 (B method, Xenon arc method) test standard.
   (3) Light fastness was measured in accordance with the KS K ISO 105 B02:2015 (Xenon arc method) test standard.
   (4) Dry cleaning fastness was measured in accordance with the KS K ISO 105 D01:2010 test standard.
   (5) Perspiration fastness was measured in accordance with the KS K ISO 105 E04:2013 test standard.

2. Dry Cleaning Dimensional Change Rate (Solvent: Perchloroethylene)
   A dry cleaning dimensional change rate was measured according to the KS K ISO 3759:2014 and KS K ISO 3175-3:2014 test standards.
   (+) sign: elongation, (−) sign: contraction 3. Deodorization Rate
   A deodorization rate was measured in accordance with the gas detector tube method.
   1. Test Conditions
   ① Sample amount: 10 cm×10 cm (1.6 g)
   ② Test gas: ammonia ($NH_3$)
   ③ Concentration of injected test gas: 500 μg/mL
   ④ Volume of test vessel: 1000 mL
   2. Test Environment
   ① Temperature: 20° C.
   ② Humidity: 65%
   3. Deodorization rate (%)=[(concentration of blank gas-concentration of sample gas)/concentration of blank gas]×100

4. Antibacterial Activity
   Antibacterial activity was measured in accordance with the KS K 0693:2016 test standard.
   1. Test Bacteria:
   Test bacterium ①: *Staphylococcus aureus* ATCC 6538
   Test bacterium ②: *Klebsiella pneumoniae* ATCC 4352
   2. Concentration of Inoculated Bacterial Solution:
   Test bacterium ①: $1.0 \times 10^5$ CFU/mL
   Test bacterium ②: $0.9 \times 10^5$ CFU/mL
   3. Control: Standard Cotton Cloth
   4. Non-ionic surfactant: Tween 80, 0.05% of inoculated bacterial solution added 5. Dyeing Appearance Evaluation
   Dyeing appearance was evaluated by 50 panelists, and the average score evaluated by each panelist was 0 to 10 points, with 8 or more points-Excellent, 6 to 7 points-Good, 4 to 5 points-Normal, 2 to 3 points-Somewhat inadequate, and less than 2 points-Inadequate.

TABLE 1

| Classification | | Example 1 | Example 2 | Example 3 | Example 4 | Example 5 |
|---|---|---|---|---|---|---|
| Fastness | Friction fastness (grade) | 4-5 | 3 | 2 | 4-5 | 4-5 |
| | Perspiration/light fastness (grade) | 5 | 4 | 3 | 3 | 5 |
| | Light fastness (grade) | 5 | 4 | 3 | 3 | 5 |
| | Dry cleaning fastness (grade) | 5 | 4 | 3 | 4 | 5 |
| | Perspiration fastness (grade) | 4-5 | 3 | 2 | 4-5 | 4-5 |
| Dry cleaning dimensional change rate (%) | Warp thread direction (length) | 0.0 | 0.0 | −0.4 | 0.0 | 0.0 |
| | Weft thread direction (width) | 0.0 | 0.0 | +0.3 | +0.1 | 0.0 |
| Deodorization rate (%) | Test period of 30 minutes | >99 | 84 | >99 | >99 | >99 |
| | Test period of 60 minutes | >99 | 89 | >99 | >99 | >99 |
| | Test period of 90 minutes | >99 | 93 | >99 | >99 | >99 |
| | Test period of 120 minutes | >99 | 95 | >99 | >99 | >99 |
| Antibacterial activity (%) | Test bacterium ① | >99.9 | 97 | >99.9 | >99.9 | >99.9 |
| | Test bacterium ② | >99.9 | 96 | >99.9 | >99.9 | >99.9 |
| Dyeing appearance | | Excellent | Somewhat inadequate | Normal | Normal | Somewhat inadequate |

TABLE 2

| Classification | | Example 6 | Example 7 | Example 8 | Example 9 |
|---|---|---|---|---|---|
| Fastness | Friction fastness (grade) | 4 | 1 | 4-5 | 3 |
| | Perspiration/light fastness (grade) | 4 | 2 | 4 | 4 |
| | Light fastness (grade) | 4 | 2 | 4 | 3 |
| | Dry cleaning fastness (grade) | 4 | 2 | 4 | 4 |

TABLE 2-continued

| Classification | | Example 6 | Example 7 | Example 8 | Example 9 |
|---|---|---|---|---|---|
| | Perspiration fastness (grade) | 4 | 1 | 4 | 3 |
| Dry cleaning dimensional change rate (%) | Warp thread direction (length) | −0.3 | −0.8 | −0.1 | −0.4 |
| | Weft thread direction (width) | +0.1 | +0.5 | +0.1 | +0.2 |
| Deodorization rate (%) | Test period of 30 minutes | 75 | 71 | >99 | 84 |
| | Test period of 60 minutes | 82 | 78 | >99 | 89 |
| | Test period of 90 minutes | 87 | 81 | >99 | 93 |
| | Test period of 120 minutes | 90 | 83 | >99 | 95 |
| Antibacterial activity (%) | Test bacterium ① | 98 | >99.9 | >99.9 | >99.9 |
| | Test bacterium ② | 98 | >99.9 | >99.9 | >99.9 |
| | Dyeing appearance | Normal | Good | Normal | Normal |

TABLE 3

| Classification | | Comparative Example 1 | Comparative Example 2 | Comparative Example 3 | Comparative Example 4 | Comparative Example 5 |
|---|---|---|---|---|---|---|
| Fastness | Friction fastness (grade) | 1 | 2 | 4 | 2 | 4 |
| | Perspiration/light fastness (grade) | 2 | 3 | 4 | 2 | 5 |
| | Light fastness (grade) | 2 | 3 | 4 | 3 | 5 |
| | Dry cleaning fastness (grade) | 2 | 3 | 4 | 3 | 5 |
| | Perspiration fastness (grade) | 1 | 2 | 3 | 2 | 4 |
| Dry cleaning dimensional change rate (%) | Warp thread direction (length) | −0.7 | −0.5 | −0.2 | −0.5 | −0.1 |
| | Weft thread direction (width) | +0.3 | +0.2 | +0.1 | +0.3 | +0.1 |
| Deodorization rate (%) | Test period of 30 minutes | 63 | 61 | 78 | 81 | >99.9 |
| | Test period of 60 minutes | 69 | 68 | 84 | 87 | >99.9 |
| | Test period of 90 minutes | 74 | 73 | 88 | 93 | >99.9 |
| | Test period of 120 minutes | 78 | 76 | 91 | 95 | >99.9 |
| Antibacterial activity (%) | Test bacterium ① | 93 | 90 | 95 | 97 | >99.9 |
| | Test bacterium ② | 92 | 88 | 93 | 97 | >99.9 |
| Dyeing appearance | | Somewhat inadequate | Inadequate | Somewhat inadequate | Good | Somewhat inadequate |

As can be seen in Tables 1 to 3, it was confirmed that the naturally dyed fabric produced according to Example 1 exhibited excellent fastness, a small dimensional change rate, excellent antibacterial activity, an excellent deodorization rate, and excellent dyeing appearance.

As is apparent from the foregoing description, a natural dyeing method using shouliang yam rhizome according to the present disclosure not only exhibits excellent dyeing fastness such as friction fastness and light fastness, but also is eco-friendly and exhibits excellent dyeing appearance, antibacterial activity, and deodorization.

Simple modifications or changes may be easily made in the present disclosure by those of ordinary skill in the art, and all of these modifications or changes should be construed as being within the scope of the present disclosure.

What is claimed is:

1. A natural dyeing method using shouliang yam rhizome, the method comprising:
   a first process of preparing a shouliang yam rhizome extract by mixing crushed shouliang yam rhizome and water, and then extracting the mixture at a temperature between about 28° C. and about 36° C. for about 1 hour to about 5 hours;
   a second process of performing dyeing twice or more by immersing a fabric in the shouliang yam rhizome extract and drying the immersed fabric;
   a third process of performing first color development twice or more by immersing the fabric subjected to the dyeing process in a mixed solution of the shouliang yam rhizome extract and water and drying the immersed fabric;
   a fourth process of performing aging twice or more by uniformly spreading mud on one surface of the fabric subjected to the first color development, followed by aging for about 60 minutes to about 90 minutes, and drying the aged fabric;
   a fifth process of performing second color development twice or more by immersing the fabric subjected to the aging process in the shouliang yam rhizome extract and drying the fabric; and a sixth process of coating both surfaces of the fabric subjected to the second color development process with a silicon coating solution to produce a naturally dyed fabric.

2. The natural dyeing method of claim 1, wherein the mixing of the first process comprises mixing crushed shouliang yam rhizome and water in a weight ratio of about 1:about 0.8-1.6.

3. The natural dyeing method of claim 1, wherein the dyeing of the second process is performed 20 times to 40 times.

4. The natural dyeing method of claim 1, wherein the mixed solution of the third process has a temperature between about 24° C. and about 32° C., and is obtained by mixing the shouliang yam rhizome extract and water in a weight ratio of about 1:about 0.8-1.6.

5. The natural dyeing method of claim 1, wherein the first color development of the third process is performed three to nine times, and the second color development of the fifth process is performed three to nine times.

6. The natural dyeing method of claim 1, wherein the mud in the fourth process is uniformly spread on one surface of the fabric subjected to the first color development to have an average thickness of about 3 mm to about 5 mm.

7. The natural dyeing method of claim 1, wherein the aging of the fourth process is performed 20 times to 30 times.

8. The natural dyeing method of claim 1, wherein the silicon coating solution comprises a first silicon base solution and a second silicon base solution in a weight ratio of about 1:about 8-12, wherein the first silicon base solution comprises about 65 wt % to about 75 wt % of a compound represented by Formula 1 below and about 25 wt % to about 35 wt % of a compound represented by Formula 2 below, with respect to a total weight %, and the second silicon base solution comprises about 75 wt % to about 85 wt % of a compound represented by Formula 1 below, about 5 wt % to about 15 wt % of silicon dioxide, and about 5 wt % to about 15 wt % of a compound represented by Formula 3 below, with respect to a total weight %.

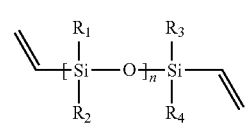
[Formula 1]

wherein, in Formula 1, $R_1$, $R_2$, $R_3$, and $R_4$ are each independently a C1-C5 alkyl group, and n is a rational number satisfying 1 to 500,

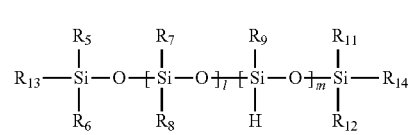
[Formula 2]

wherein, in Formula 2, $R_5$, $R_6$, $R_7$, $R_8$, $R_9$, $R_{11}$, $R_{12}$, $R_{13}$, and $R_{14}$ are each independently a C1-C5 alkyl group, and l and m are each independently a rational number satisfying 1 to 300, and

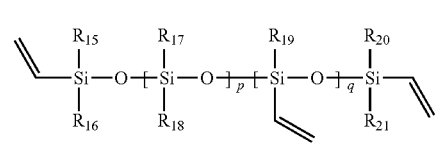
[Formula 3]

wherein, in Formula 3, $R_{15}$, $R_{16}$, $R_{17}$, $R_{18}$, $R_{19}$, $R_{20}$ and $R_{21}$ are each independently a C1-C5 alkyl group, and q and p are each a rational number satisfying 1 to 300.

9. The natural dyeing method of claim 1, wherein the fabric is cotton, linen, silk, or wool.

10. The natural dyeing method of claim 1, wherein condition (1) below is satisfied:

$$1.0 \leq B/A \leq 1.25 \qquad (1)$$

wherein, in condition (1), A denotes a basis weight (g/m²) of the fabric, and B denotes a basis weight (g/m²) of the naturally dyed fabric.

* * * * *